US005444266A

United States Patent [19]

Takeda et al.

[11] Patent Number: 5,444,266

[45] Date of Patent: Aug. 22, 1995

[54] PHOTOSTIMULABLE PHOSPHOR PLATE AND PHOTOSTIMULABLE PHOSPHOR READER

[75] Inventors: Shiro Takeda, Sagamihara; Fumihiro Namiki, Machida; Yuuichi Sugiyama, Chigasaki; Nobuhiro Iwase; Shinji Tadaki, both of Atsugi; Nagaaki Koshino, Yokohama, all of Japan

[73] Assignee: Fujitsu Limited, Kawasaki, Japan

[21] Appl. No.: 79,951

[22] Filed: Jun. 2, 1993

Related U.S. Application Data

[63] Continuation of Ser. No. 613,738, Nov. 21, 1990, abandoned.

[30] Foreign Application Priority Data

| | | | |
|---|---|---|---|
| Apr. 3, 1989 | [JP] | Japan | 1-84253 |
| May 24, 1989 | [JP] | Japan | 1-130739 |
| May 29, 1989 | [JP] | Japan | 1-135573 |
| Jun. 7, 1989 | [JP] | Japan | 1-144349 |

[51] Int. Cl.[6] .......... G01N 23/04

[52] U.S. Cl. .......... 250/586; 250/484.4; 250/486.1; 250/585

[58] Field of Search .......... 250/484.18, 486.1, 327.2, 250/484.4, 586, 585

[56] References Cited

U.S. PATENT DOCUMENTS

| | | | |
|---|---|---|---|
| 2,827,571 | 3/1958 | Klasens et al. | 250/486.1 |
| 4,752,557 | 6/1988 | Tsuchino et al. | 250/484.1 B |
| 4,947,046 | 8/1990 | Kawabata et al. | 250/484.1 B |

FOREIGN PATENT DOCUMENTS

| | | | |
|---|---|---|---|
| 0242024 | 10/1987 | European Pat. Off. . | |
| 0372395 | 6/1990 | European Pat. Off. . | |
| 2644927 | 9/1990 | France . | |
| 2347923 | 7/1974 | Germany . | |
| 2638114 | 3/1977 | Germany . | |
| 2462020 | 7/1980 | Germany . | |
| 3909450 | 9/1990 | Germany . | |
| 2036599 | 2/1987 | Japan | 250/486.1 |
| 129600 | 5/1990 | Japan | 250/484.4 |

OTHER PUBLICATIONS

Patent Abstracts of Japan; vol. 13, No. 165 (P-860) (3513) 20 Apr. 1989, & JP-A-1 3599 (Seiko) 9, Jan. 1989.

*Primary Examiner*—Carolyn E. Fields
*Attorney, Agent, or Firm*—Staas & Halsey

[57] ABSTRACT

A digital X-ray apparatus forms a latent image of an object on a photostimulable phosphor plate as an energy distribution pattern using X-ray energy and reads the latent image using an excitation light beam. A plate, of a material which does not transmit the excitation light beam, has holes formed therein with photostimulable phosphor positioned in the holes, the photostimulable phosphor emitting a fluorescent light when irradiated by the excitation light beam, the emitted light beam gathered and a corresponding signal produced. The excitation light beam reflected from the photostimulable phosphor plate is also gathered and a signal responsive thereto also is produced. A method of production by stacking and bonding plural metal sheets having appropriate patterns of holes therein with the photostimulable phosphor and a transparent protection film layer thereon provides the structure of the photostimulable phosphor plate.

6 Claims, 10 Drawing Sheets

PHOTOSTIMULABLE PHOSPHOR PLATE AND PHOTOSTIMULABLE PHOSPHOR READER

This application is a continuation of application Ser. No. 07/613,738, filed Nov. 21, 1990, now abandoned.

FIELD OF THE INVENTION

The present invention relates to a photostimulable phosphor plate and a reader thereof utilizing excited light beam and a scattering preventing means for the excited light beam and photostimulable fluorescent light. In more detail, a radiation image such as an X-ray image is often used for medical diagnosis. In order to obtain such X-ray image, a so-called radiation photograph has been used. In this case, a phosphor layer (fluorescent screen) is irradiated with the X-ray which has been transmitted through an object, a visible light beam is generated therefrom and, a film using silver salt is then irradiated with such visible light beam for the purpose of development. As a system to be replaced with an X-ray imaging apparatus for recording directly or indirectly a bidimensional image of radiation on a prior art film on which a silver salt photosensitive material is coated like a sheet, a high sensitive and high resolution X-ray imaging system has been developed.

BACKGROUND OF THE INVENTION

A high sensitive and high resolution X-ray imaging apparatus explained above is designed as a system utilizing a photostimulable phosphor, or stimulable phosphor. A basic system of this apparatus has been described in detail in the U.S. Pat. No. 3,859,527. The phosphor used in this system stores a part of energy, upon reception of energy of radiation such as X-ray. This condition is comparatively stable and is therefore maintained for a long period of time. When the phosphor under this condition is irradiated with the first light beam working as the excited (i.e., excitation) light beam, the stored energy is emitted as the second light beam. In this arrangement, as the first light beam, the light having the wavelength in the wider range from the infrared beam to ultraviolet beam can also be used as well as the visible light beam. However, selection depends on the phosphor material used. The second light is also emitted through wide selection from the infrared beam to ultraviolet beam. Selection of such light also depends on the phosphor material used. The second electromagnetic beam is received, converted to an electrical signal by a photoelectric converter, then converted to a digital signal and thereby digital image information can be obtained.

The photostimulable phosphor layer which has been used in the prior art is not transparent for the first light beam, namely the excited light beam, and the second light beam, namely the photostimulable emitted light beam, and showed distinctive scattering phenomenon. Therefore, even when the photostimulable phosphor layer is irradiated with the excited light beam flux in such a size as is equal to one pixel or is smaller than such pixel, the excited light beam flux is scattered very widely and it has also been observed that when the phosphor layer, for example in the thickness of 0.3 mm, is irradiated with the excited light beam flux in diameter of 0.1 mm, the flux is scattered, at the surface opposed to the irradiation surface, up to the size larger than 1 mm in diameter, in some cases, up to the size larger than 3 mm in diameter.

FIG. 1 shows such scattering condition. As a result of such scattering of the light beam flux, if one pixel is sized as 0.1 mm square in this case, a part of the information of the adjacent 100 to 900 pixels is detected as an error when the one pixel is read, thereby the space resolution of image obtained is remarkably deteriorated and the image is naturally defocused. In order to alleviate the scattering of excited light beam, several methods have been proposed. For instance, a method for decomposing white fine particles in the phosphor layer is described in the Japanese Laid-open Patents Nos. 55-146447 and 58-58500, a method for adding a coloring agent which absorbs the excited light beam is described in the Japanese Laid-open Patent No. 61-170740 and a method for forming a coloring agent or white fine particles on a supporting substrate of the photostimulable phosphor is described in the Japanese Laid-open Patent No. 62-211600. These methods have been attempted to improve sharpness of image for an intensifying screen of the X-ray film of the prior art, however, it is obivous that these methods cannot perfectly remove the scattering of the excited light beam. Moreover, the method for forming cracks in the vertical direction in the photostimulable phosphor layer or forming a honycomb structure is disclosed in the Japanese Laid-open Patent No. 60-171500 or it is also attempted that the scattering is prevented by forming a pattern of projected and recessed areas or mosaic patern on the substrate surface. However, these methods cannot also prevent perfectly the scattering of excited light beam, and still provide a possibility of forming Moire patterns on the image obtained.

SUMMARY OF THE INVENTION

The present invention has been proposed, under the technical background as explained above, to provide a photostimulable phosphor plate which does not show any scattering for the emitted fluorescent light.

The first means for attaining this object is constituted so that fine holes 26 burying photostimulable phosphor 6 within the hole forming portions 2 which are processed in almost the same size and does not penetrate the excited light beam are provided at respective crossing positions in the crossing direction, comprising the hole forming portions 2 which are processed in almost the same size at respective crossing positions in the crossing direction and does not allow transmission of excited light beam, the light transmissivity sealing material 4 provided in the light penetrating side of the hole forming portions 2, the sealing materials 5 provided at the surface opposed to the surface in the light penetrating side of the hole forming portion forming substrate, and the phosphor 6 imbedded in the hole forming portion 2 sealed by the light transmissivity sealing material 4 and sealing material 5.

Moreover, the second means is constituted so that the fine holes 26 which are almost the same in size and does not penetrate the excited light beam at the internal side wall 2 thereof are provided at the hole forming positions of the substrate in the regular positional layout wherein the adjacent hole foming positions are deviated only by the value required for approximation and the photostimulable phoshor is buried within such fine holes 2, comprising the fine holes in almost the same size which does not penetrate the excited light beam at the internal side wall 2 thereof at the hole forming positions of the substrate in the regular positional layout wherein the adjacent hole foming positions are deviated only by the value required for approximation, the light transmissivity sealing material 4 provided in the surface of light penetrating side of the fine hole 2 forming substrate, the sealing material 5 provided in the surface opposed to the light penetrating side of the fine hole 26 forming substrate, and the photostimulable phosphor 6 filling the fine holes 26 sealed by the light transmissivity sealing material 4 and sealing material 5.

The third means is constituted so that the fine holes 15 are arranged like a matrix and the arrangement of fine holes 16 matches with the direction in the subscanning direction of the excited light beam scanning and also matches, in the main scanning direction, with the straight line having the relationship, $\Delta = b - b(1 - \eta)$ wherein the pitch of read line which is equal to the size of pixel in the subscanning direction is assumed as b, the scanning efficiency of excited light beam scanning as $\eta$, and deviation in the subscanning direction of the starting and ending points of fine holes 16 on the one read line as $\Delta$.

Moreover, the fourth means is constituted in a digital X-ray apparatus which forms a latent image of object on the photostimulable phosphor plate 105 as an energy distribution pattern using the X-ray energy and reads such latent image using the excited light beam so that one pixel of the specimen is individually formed, on the occasion of forming latent image of the object, in the corresponding one and larger integer number of fine holes of the photostimulable phosphor plate forming, in each crossing positions in the crossing direction, the fine holes 2 of almost the same size burying the photostimulable phosphor in the hole foming portion 2 processed at least on the substrate which does not penetrate the excited light beam and respective pixels accumulated in the one or larger integer number of fine holes are read out for recovery of the image data.

Moreover, the fifth means is constituted in a digital X-ray apparatus which forms a latent image of specimen on the photostimulable phosphor plate 105 as an energy distribution pattern using the X-ray energy and reads such latent image using the excited light beam; comprising a means for scanning the photostimulable phosphor plate, which is provided with fine holes burying photostimulable phosphor in the hole fomring portion (2) which does not penetrate the excited light beam and shows reflectivity for the excited light beam at the plate surface other than the fine holes portions, in the direction of hole arrangement with the excited light beam; an emitted fluorescent light gathering means for gathering the emitted fluorescent light with the excited light beam from the photostimulable phosphor buried in the fine holes; a reflected excited light beam gathering means for gathering the excited light beam reflected from the photostimulable phosphor plate; an excited light beam irradiation period detecting means for detecting the period of excited light beam irradiated on the fine holes buried by the photostimulable phosphor from the signal obtained from the reflected excited light beam gathering means and a means for sampling the emitted fluorescent light obtained by the photostimulable fluorescent light gathering means as the pixel information during the period obtained by the excited light beam irradiation period detecting means.

DESCRIPTION OF THE PREFERRED EMBODIMENTS

Figure 2A:
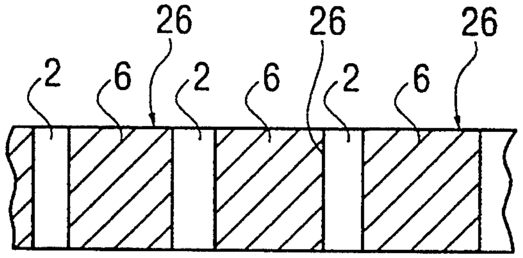
FIGS. 2A and 2B are sectional views of a photostimulable phosphor of the present invention.
Figure 2B:
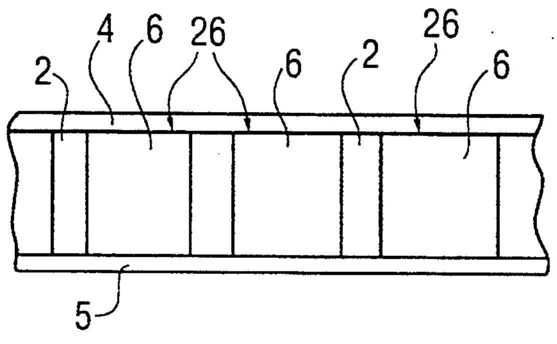

FIGS. 2A and 2B illustrate the first embodiment of the present invention. FIG. 2A is a photostimulable phosphor plate providing, at the crossing positions of crossing direction, the fine holes 26 of almost the same size burying the photostimulable phosphor 6 in the hole forming portions processed so as not to penetrate the excited light beam.

FIG. 2B shows the hole forming portions each of which is formed almost in the same size and processed so as not to penetrate the excited light beam at respective crossing positions in the crossing direction, a light transmissivity sealing material 4 provided in the light penetrating side of the hole forming portion 2, a sealing material 5 provided in the surface opposed to the light penetrating side of the hole forming portion forming substrate, and a photostimulable phosphor 6 buried in the hole forming portion 2 sealed by the light transmissivity sealing material 4 and sealing material 5.

The X-ray energy of object pattern which has been obtained therethrough when the specimen is irradiated with the X-ray is distributed and stored in the fine holes 26 regularly arranged on the photostimulable phosphor plate. The photostimulable phosphor plate having such energy distribution pattern is scanned with the excited light beam and thereby the object pattern formed as the energy distribution pattern thereon may be extracted as an electrical signal pattern.

Figure 3:
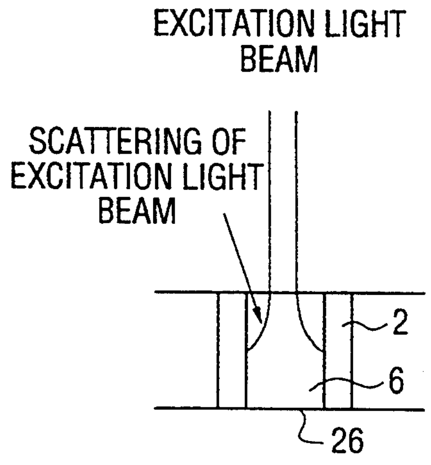
FIG. 3 is a diagram for explaining scattering of an excited light beam at the photostimulable phosphor of the present invention.

On the occasion of outputting the electrical signal pattern, the fine holes 26 regularly arranged on the photostimulable phosphor plate are scanned along the one direction of crossing directions with the excited beam. Since the photostimulable phosphor irradiated with the excited beam is provided within the hole wall 2 which does not penetrate the excited light beam, the excited light beam is never scattered. Therefore, reduction of space resolution can be prevented perfectly. FIG. 3 shows the profile of preventing reduction of space resolution.

A manufacturing method of photostimulable phosphor plate of the present invention will be explained hereunder with reference to FIGS. 4A–4F. This manufacturing method utilizes the etching.

Figure 5A:
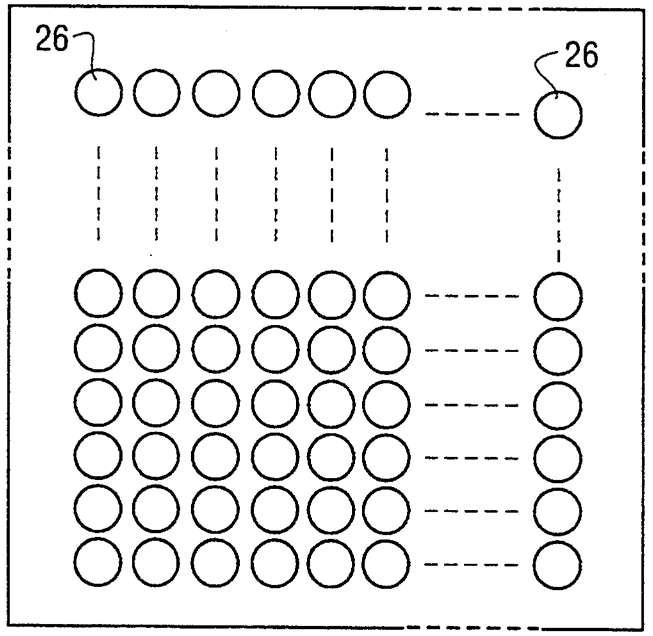
FIGS. 5A and 5B are diagrams indicating the photostimulable phosphor plate providing fine circular holes.
Figure 5B:
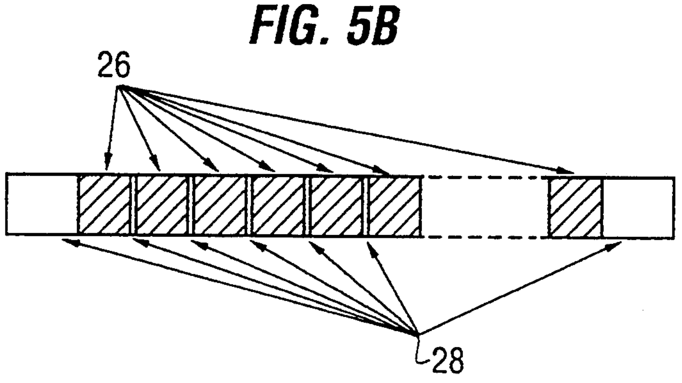
Figure 4A:
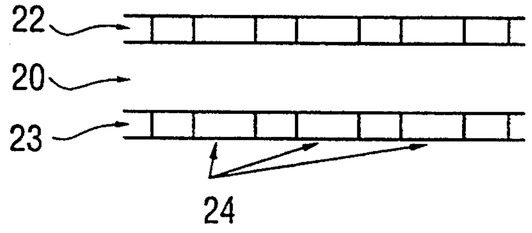
FIG. 4A is a diagram indicating the photostimulable phosphor manufacturing process in the present invention.
Figure 4B:
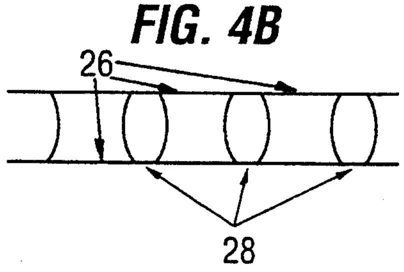
FIG. 4B–4F are diagrams indicating the photostimulable phosphor manufacturing process in the present invention.
Figure 4C:
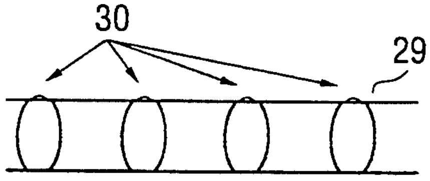
Figure 4D:
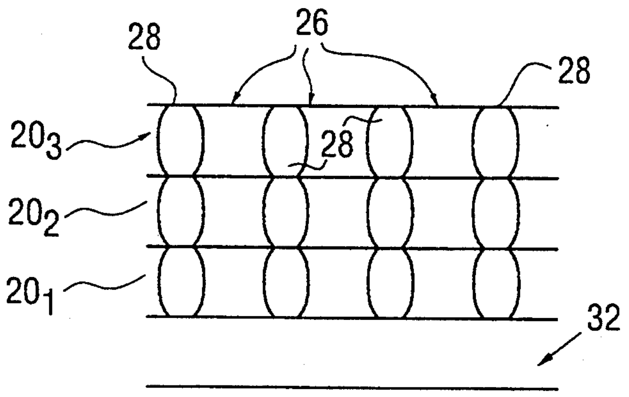
Figure 4E:
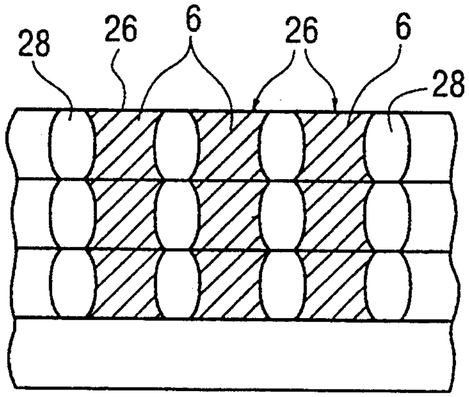
Figure 4F:
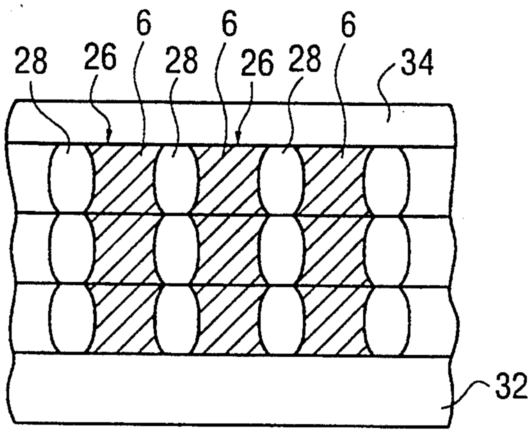
Figure 6A:
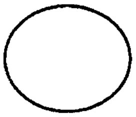
FIGS. 6A–6G are diagrams indicating various flat shapes of fine holes.
Figure 6B:
Figure 6C:
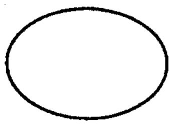
Figure 6D:
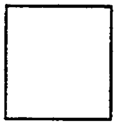
Figure 6E:
Figure 6F:
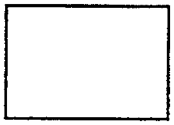
Figure 6G:
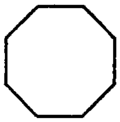
Figure 7A:
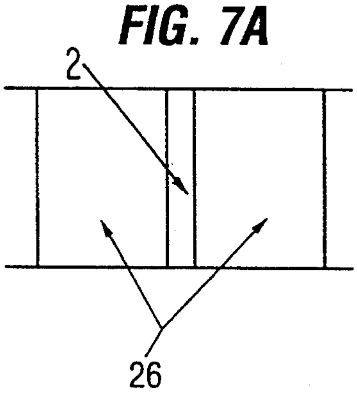
FIGS. 7A–7F are diagrams indicating various sectional shapes of fine holes.
Figure 7B:
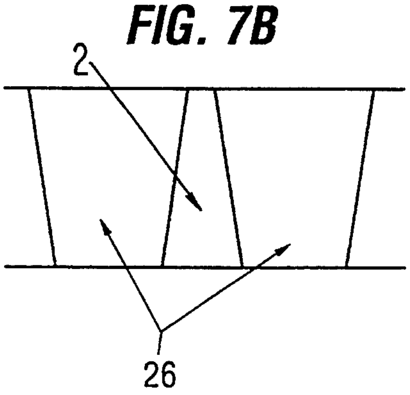
Figure 7C:
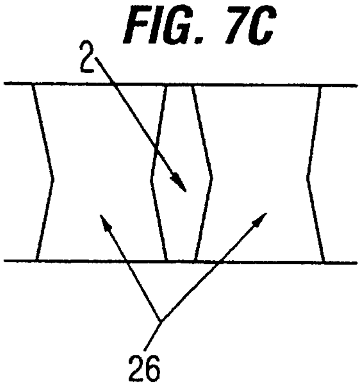
Figure 7D:
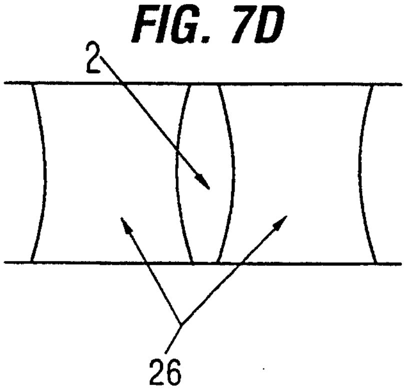
Figure 7E:
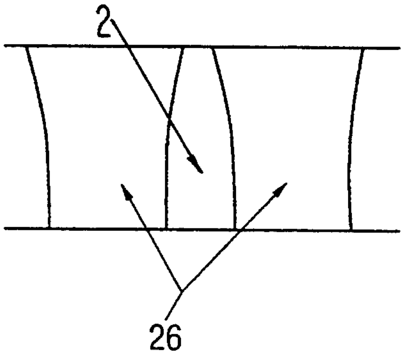
Figure 7F:
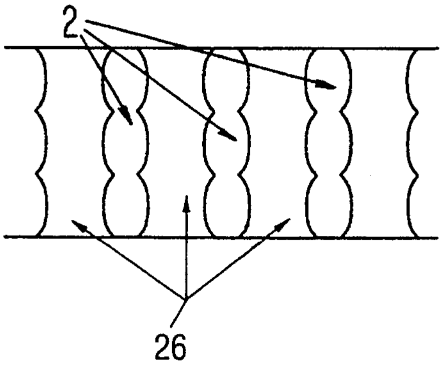

First, a resist pattern (refer to FIG. 5A) to form fine holes on a thin stainless steel plate is produced by the well known CAD techinique. Here, the diameter of the part corresponding to the hole of the pattern is set smaller than the diameter of the fine hole. Using this resist pattern, the masks 22, 23 are formed on both surfaces of the stainless steel plate 20 (refer to FIG. 4A). The reference numeral 24 designates mask hole of the masks 22, 23. The fine holes 26 are formed as shown in FIG. 4B by effectuating etching agent to the stainless steel plate 20 through the mask holes 24. The reference numeral 28 designates hole wall. The hole wall area 29 of the plate surface is coated with an adhesive agent 30 by the screen printing method (FIG. 4C). In the case of stainless steel plate $20_2$, both surfaces are coated with the bonding agent 30 as shown in FIG. 4D, while in the case of the stainless steel plates $20_1$, $20_3$, only the surfaces in contact with the stainless steel plate $20_2$ are coated with the agent. In FIG. 4D, the reference numeral 32 designates a glass plate. After the bonding process, the deeper fine holes 26 formed by the stacked three sheets of stainless steel plates $20_1$ to $20_3$ are filled with the photostimulable phosphor powder 6 (BaFBr:$Bu^{2+}$) (refer to FIG. 4E) and a polyester protection layer 34 (refer to FIG. 4F) is formed thereon, thereby completing the manufacture of photostimulable phosphor plate (refer to FIGS. 5A and 5B).

The wall surface of fine hole 26 has the optical surface and efficiently reflects the excited light beam and emitted fluorescent light. Therefore, the excited light beam does not penetrate through the wall surface of fine hole and the emitted fluorescent light from the photostimulable phosphor due to irradiation thereof by the excited light beam can be collected efficiently (refer to FIG. 3). Accordingly, reduction of space resolution of image can be prevented. Moreover, the quantity of photostimulable fluorescent light emitted from the photostimulable phosphor due to irradiation of excited light beam can be increased by stacking the stainless steel plates as explained previously. In this case, reduction of space resolution is not increased thereby.

The thin stainless steel plate used in this embodiment may be replaced with another thin metal plate or plastic plate. Many fine holes may be formed on a thin metal plate or plastic plate by various methods including the etching method and mechanical processing method. Here, there is no limitation on such fine hole forming method.

In this case, the fine holes 26 formed show various shapes depending on material and forming method (refer to FIG. 6 and FIGS. 7A–7F). For example, when it is assumed that the fine holes in diameter o f 0.08 mm are formed on the stainless steel plate in the thickness of 0.1 mm with the vertical and horizontal pitch of 0.1 mm by the etching method, the shape of hole will never become straight. In case the etching is made only to the single side, only the single side becomes larger. In case the etching is made to both sides, the center is narrowed. Otherwise, other shapes appear depending on the method of forming the holes of mask. In case the holes are formed by the electrospark machining method, the shape becomes comparatively straight. Namely, the holes take various shapes but it is possible to execute the present invention without relation to the shape of hole. Although the shape of fine hole is not particularly restricted, the circular, elliptical, square, rectangular or polygonal shapes are actually introduced for the convenience of manufacture (refer to FIG. 6). In case the wall surface of the fine holes thus formed penetrates the excited light beam due to the property of the wall material, the wall surfaces may be coated or evaporated with the material which does not penetrate the excited light beam in order to prevent penetration of excited light beam. Moreover, in case the wall surface of hole does not have surface accuracy from the optical view point, it is effective to smooth the surface by coating it with resin and form thereon a layer such as metal having a high reflectivity.

Although the size of fine hole is not particularly restricted, the lower limit lies in about 0.01 mm because of technical difficulty of burying the photostimulable phosphor in the fine holes of a certain thickness and moreover the upper limit is about 0.4 mm from the viewpoint of the space resolution required for X-ray image diagnosis. The fine holes are provided perpendicular to the surface of photostimulable phosphor plate; but these may formed prefectly perpendicular or with inclination. An inclined hole may be formed, for example, by a process wherein many capillaries of the same internal diameter as the diameter of fine hole are bundled in the square arrangement or bundled in layer by layer, the space between the capillaries is filled with adhesive agent, this adhesive agent is hardened, and thereafter these capillaries are cut with inclination and ground and washed. The shape of the hole may be straight or the sizes of upper and lower portions of the hole may be different. Moreover, any kind of material may be selected from those having a certain mechanical strength even after formation of hole.

In this embodiment, a glass plate is used for the single surface of stainless steel plate after formation of the fine holes, but it is also possible to use a metal sheet. In this case, it is preferable that the sheet used reflects the excited light beam and emitted fluorescent light. Or, the sheet which reflects the excited light beam but penetrates the emitted fluorescent light may also be used and the sheet having the inverse property may also be used depending on the way of use, namely, depending on the selection of the irradiating direction of the excited light beam or collecting direction of the emitted fluorescent light. A cover which functions as a selection mirror may also be effectively formed to both sides using adhesive agent. Althouth not particularly limited, it is effective to use materials, as the cover, such as lead glass which penetrates the excited light beam and photostimulable emitted light and absorbs the X-ray in order to prevent the back scattering beam of X-ray. Or, it is also effective to attach a lead plate.

As the photostimulable phosphor buried in the fine holes, those which do not penetrate the excited light beam to show the scattering or penetrate the excited light beam or emitted fluorescent light in any composition may be used without restriction, and the burying method is also not restricted. Namely, the method where the photostimulable phosphor powder of the grain size of 5 μm or less is dispered into the solution of binder and the solution is then supplied into the holes, or the case where the photostimulable phosphor powder is put in direct into the fine holes and thereafter the binder is then soaked thereto, or the method where a layer which may be dissolved later is formed to the part other than the holes by the lift-off method, the holes are filled with the photostimulable phosphor by the evaporation and thereafter the photostimulable phosphor is removed from the part other than the holes, may be used.

Figure 8:
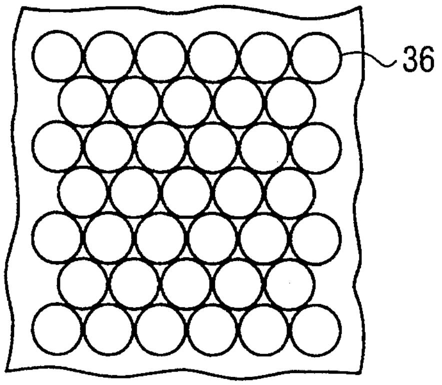
FIG. 8 shows a photostimulable phosphor arranging circular fine holes in the highest density.

Referring to FIG. 8, the fine holes 26 which are almost the same in the size and provides the internal wall surface 2 which does not penetrate the excited light beam are provided at respective hole forming positions of the substrate providing the regular arrangement positions wherein the adjacent hole forming positions are displaced by the value required for approximating the hole forming positions like the second embodiment and the photostimulable phosphor is buried in the fine holes 26.

Moreover, explained hereunder is the photostimulable phosphor comprising fine holes 26 of almost the same size providing the wall surface 2 which does not penetrate the excited light beam processed at the respective hole forming positions of the substrate having the regular hole arrangement where at least adjacent hole forming positions are previously deviated by the predetermined value, the light transmissivity sealing material 4 arranged at the surface in the light penetrating side of the fine hole forming substrate, the sealing material 5 arranged in the surface opposed to the light penetrating side of the fine hole forming substrate and the photostimulable phosphor 6 burying the fine holes 26 sealed by the light beam transmissivity sealing material 4 and sealing material 5.

The fine holes of photostimulable phosphor plate of the second embodiment are arranged in the highest density as shown in FIG. 8.

Namely, since fine holes 26 are formed closely with each other, quantity of photostimulable phosphor buried in the photostimulable phosphor plate increases and the phosphor effectively prevents reduction of energy to be stored therein.

The cross sectional view of the second embodiment is shown in FIG. 2.

Like the first embodiment, since the photostimulable phosphor irradiated with the excited light beam is buried within the internal wall surface 2 which does not penetrate the excited light beam, the light beam is never scattered. Accordingly, reduction of space resolution can be prevented perfectly.

The method of manufacturing the photostimulable phosphor plate is similar to that of the first embodiment and the resist having a pattern as shown in FIG. 8 is used.

Figure 9:
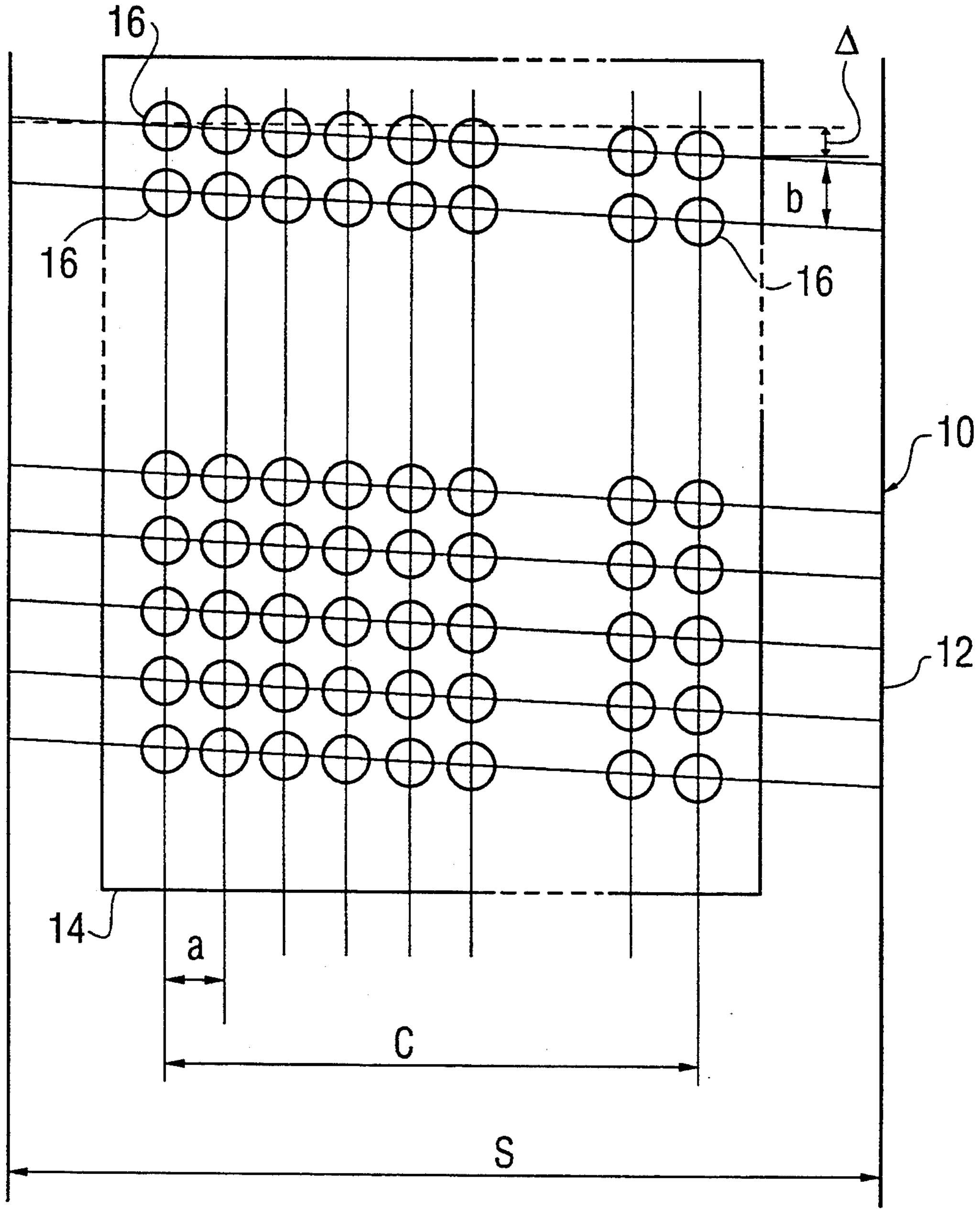
FIG. 9 is a photostimulable phosphor plate as the third embodiment of the present invention.

Next, the third embodiment of the present invention will be explained with reference to FIG. 9. In FIG. 9, a photostimulable phosphor plate 10 is formed by a plurality sheets of stainless sheet 12. Each stainless sheet 12 is in the thickness of 0.1 mm and in the size of 380 mm square. The center area thereof (356 mm square) 14 is provided with a plurality of fine holes 16 arranged in the form of lattice. On the occasion of forming such fine holes 16, the size of one pixel is determined. For example, the size of one pixel of the photostimulable phosphor plate or sheet for diagnosing breast cancer is set to almost 50 $\mu$m square. In the case of X-ray image of chest, the one pixel size is set to 87.5 $\mu$m square to 175 $\mu$m square in order to process the digital information. Although this size is not essential, diagnosis may be realized with such space resolution. Therefore, the size of pixel must be changed depending on the object tissue and in the case of the present invention, the photostimulable phosphor plate or sheet in various kinds of pixel sizes may be used. The possible minimum pixel size is determined by the possible excited light beam diameter. The current minimum size of pixel is about 20 $\mu$m square. The maximum pixel size is not limited from the viewpoint of possibility in realization and the diagnostic purpose is not attained when the pixel size is 0.4 mm square or more. Therefore, in the present invention, the one pixel size ranges from 20 $\mu$m square to 0.4 mm square and the pixel is capable of taking a square shape and rectangular shape.

When the one pixel size is determined, the circular or square fine holes 16, each of which is smaller than the diameter of one pixel size, are formed on the four sheets of stainless sheets 12 depending on such determination. In this case, the lateral and vertical pitches are set to 175 $\mu$m and positional deviation of fine holes 15 between the starting and ending points is set to 52.5 $\mu$m. Moreover, the fine holes 16 are formed so that the arrangement of the fine holes matches with the subscanning direction (vertical direction) in the subscanning by the excited light beam and also matches with the straight line having the relationship of $\Delta = b - b(1-\eta)$, wherein the pitch of reading the line which is equal to the size of pixel in the subscanning direction is assumed as b and the scanning efficiency of scanning by the excited light beam as $\eta$, in the main scanning direction (lateral direction). The scanning efficiency $\eta$ is expressed as $\eta = s/c$ when the read line length is c and actual scanning length of excited light beam is s.

As the processing to form the fine holes 16 on the stainless sheet 12, the etching process has been employed. In this case, the thermosetting type epoxy resin is dissolved into an organic agent, the both sides of sheets are coated with the solution, obtained by dispersing the graphite powder, by the screen printing method except for the fine hole portions and thereafter the coated area is dried up, forming the fine holes 16 in the stainless sheet 12. The stainless sheet 12 forming the fine holes 16 and the stainless sheet 12 coated with the resin only at the single surface are stacked. Moreover, the stainless sheet not forming the fine holes 16 in the thickness of 0.2 mm is placed on the single surface. Thereby, the three sheets of stainless are pressurized with a weight and bonded through thermosetting at 180° C. In addition, a reflective film is fitted to the wall surface of fine holes 16 in order to reflect the excited light beam.

On the other hand, the phosphor powder consisting of BaC Br:Eu in the grain size of 5 $\mu$m or less is dispersed into the organic solvent including epoxy resin as the binder, it is then poured onto the sheet under the reduced pressure condition and the phosphor buried in the holes is dried up. This process is repeated three times. After confiming that the holes are filled with the photostimulable phosphor up to the surface thereof, the mixture of photostimulable phosphor and epoxy resin at the surface is wiped out. The sheets are hardened at 180° C. and moreover a transparent polyester sheet is bonded to the surface as the protection layer.

The photostimulable phosphor plate 10 manufactured as explained above is fixed on a stage and is irradiated with the laser beam of 100 $\mu$m in the scanning direction and 40 $\mu$m in the main scanning direction using the laser scanning system having the scanning efficiency of 70% consisting of the semiconductor laser with wavelength of 780 nm, lens and galvano mirror. Thereby it has been confirmed that the excited light beam penetrates through the photostimulable phosphor in the fine holes 16 and scattering to the other fine holes 16 can be prevented. Namely, the emitted fluorescent light which is emitted by irradiating the surface of photostimulable phosphor plate 10 with the X-ray to excite the phosphor with the pulse laser is gathered by a condenser mirror and glass fiber array and is received by the photomultiplier. The converted electrical signal is then converted into the digital signal through the analog to digital conversion. Here, it has been confirmed from the quantity of light received that the excited light beam reflected from the wall surface of fine holes 16 is gathered by the fiber array different from that mentioned above, it is then received by the photodiode and the excited light beam is reflected from the wall surface. In this case, the sheet is irradiated with the X-ray of the reference dose, the reference output of each pixel is input to the memory, and normal image can be obtained through compensation for change by aging of quantity of photostimulable light beam and compensation for fluctuation in change by aging of pixels.

In the present invention, size of excited beam on the phosphor plate or sheet must be smaller in such a degree determined by the degree of wobble. Here, it is preferable that the length of main scanning direction is smaller than the length of one pixel in the subscanning direction. The excited light beam used may be a continuous light or pulse beam but the length of excited light beam in the main scanning direction will be better if it is as short as possible. Moreover, it is a matter of course that the scanning must be made in such a manner that the excited light beam does not pass on the adjacent pixels in the subscanning direciton. The image of the predetermined space resolution can be read without influence of scattering of excited light beam by paying attention to these conditions.

Even in case the excited light beam scanning system and light beam gathering and receiving system are fixed and the photostimulable phosphor plate or sheet is moved or vice versa, the angle between the photostimulable phosphor plate or sheet and subscanning direction may be determined uniquely in relation to the efficiency of the scanning by the excited light beam and size of the one pixel.

The fourth embodiment of the present invention will be explained hereunder.

Figure 10:
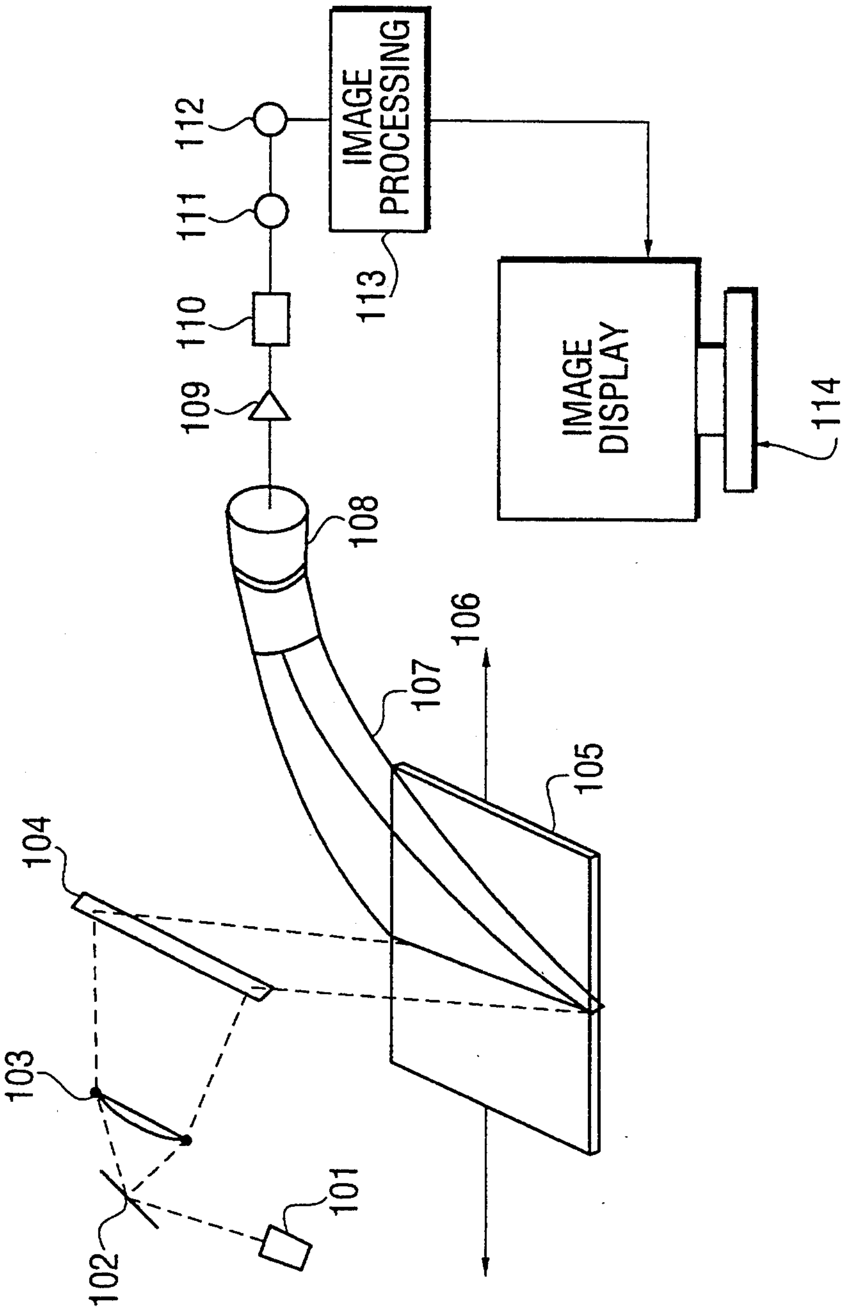
FIG. 10 shows a structure of a digital X-ray reader.

FIG. 10 is a photostimulable phosphor reader. Using the X-ray energy, a latent image of an object is formed as an energy distribution pattern on the photostimulable phosphor plate 105 and such latent image is read using the excited light beam.

As shown in FIG. 10, the laser beam output from the excited light beam source 101 is used for the scanning through the scanner 102 consisting of a galvano mirror or polygon mirror. The photostimulable phosphor 105 is scanned by such laser beam through an optical part 103 for compensating for the shape of beam such as a lens, etc. and a reflection mirror 104.

The emitted fluorescent light from the photostimulable phosphor plate 105 when the plate is scanned by the laser beam from the laser beam system is gathered by a gathering means such as a fiber array 107. The gathered light beam is converted as the quantity of light received into the electrical signal in the photoelectric converter 108 such as a photoelectron multiplier through a filter which does not transmit the excited light beam from the fiber array 107 but transmits only the photostimulable light beam and is then amplified by an amplifier 109. Thereafter, the signal is converted to the digital signal by an A/D converter 110. The digital signal is once stored in the frame memory 111 or stored in the optical disk memory 112 without passing through the frame memory. Thereafter, the processing such as gradation process is carried out as required in the image processing part 113. The image is displayed as the X-ray image on the image display part 114 such as CRT or written in directly on the X-ray film through the film writing apparatus and it is then developed to obtain the X-ray image.

This embodiment is used for reading the photostimulable phosphor as the first to third embodiment.

The laser beam diameter at the surface of photostimulable phosphor plate is set to 170 μm in the subscanning direction (in which the photostimulable phosphor moves) or to 40 μm in the main scanning direction. The laser beam diameter in the main scanning direction is preferably smaller than the length in the main scanning direction of the one pixel.

When the phosphor plate is scanned with the laser beam mentioned above, the standard one pixel to which the light is gathered has the size of 176 μm square and 16 holes in total (refer to I of FIG. 11) are provided in the one pixel.

If the one pixel has the size of 132 μm square, nine holes (refer to II of FIG. 11) exist within the one pixel. In this case, the laser beam diameter in the subscanning direction is 125 μm.

Moreover, if the one pixel has the size of 88 μm square, four holes (refer to III of FIG. 11) exist in the one pixel. In this case, the laser beam diameter in the subscanning direction is 83 μm.

When the one pixel has the size of 44 μm square, only one hole (refer to IV of FIG. 11) exits in the one pixel and the laser beam diameter in the subscanning direction is 39 μm or 20 μm in the main scanning direction.

When a number of holes of one pixel is set to 1 to 400, the object of the present invention is attained.

As explained previously, several fine holes are provided in the one pixel because if the two pixels use in common a part of certain fine hole, the space resolution is as much lowered.

Moreover, it is assumed here that several holes are used as the one pixel and the scanning line is deviated for the photostimulable phosphor at the time of reading operation. Namely, the hole located on a certain main scanning line is allocated on a certain straight line but it is also assumed here that the excited light beam is a little deviated. A certain hole is not always irradiated with the excited light beam at the entire part thereof. Namely, a certain hole is irradiated with the excited light beam only at a part thereof. However, in case the one pixel is formed with several holes, it is apparent the part not irradiated with the light beam relatively increases in comparison with the case where the one pixel is formed by one hole. Accordingly, when one pixel is formed by several holes, the read accuracy can be improved and realiability of reacting can also be enhanced.

Figure 13:
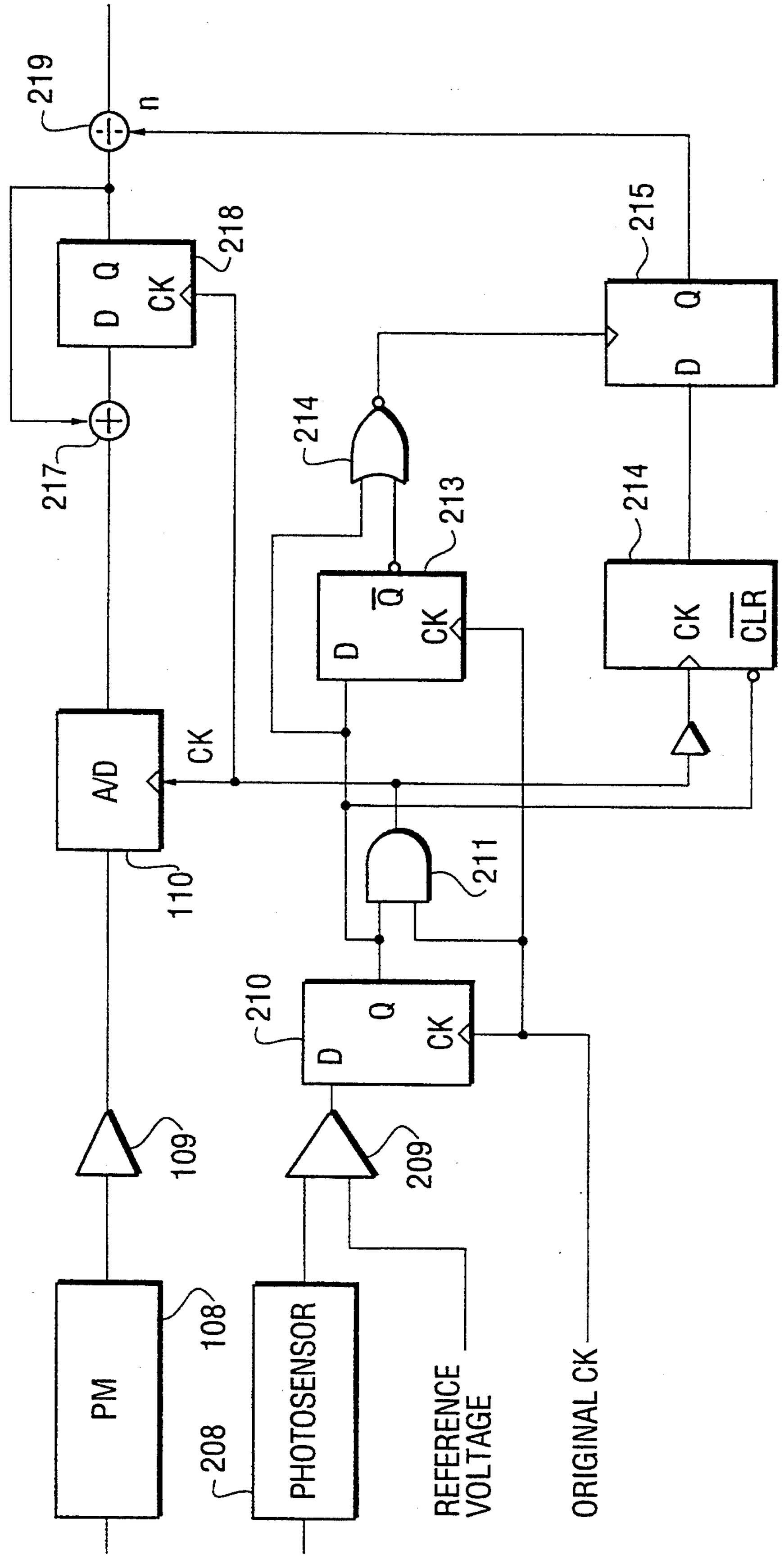
FIG. 13 is a circuit diagram for synchronizing with the reflected and excited light beam.
Figure 14:
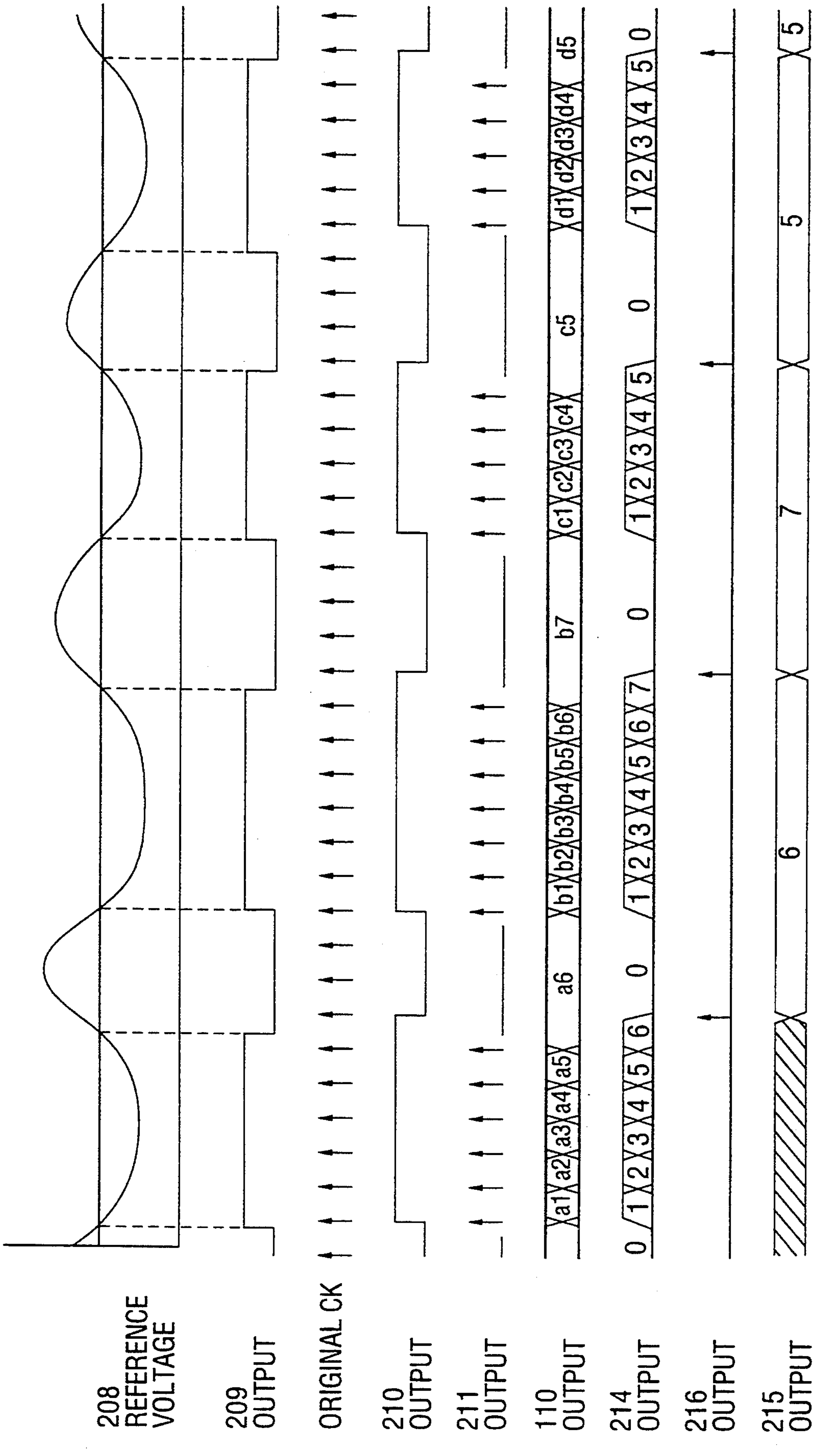
FIG. 14 is a time chart of the circuit for synchronizaing with the reflected and excited light beam.

The fifth embodiment will be explained with reference to FIG. 12, FIG. 13 and FIG. 14.

In the embodiments described previously, the light beam is gathered as shown in FIG. 10 for the scanning of the photostimulable phosphor plate. In this embodiment, the excited light beam reflected from the wall surface not forming the holes of photostimulable phosphor is gathered by the fiber array different from that of FIG. 10 or plastic light receiver and the light from the photostimulable phosphor is received through synchronization between such gathered light beam and the light from the photostimulable phosphor. The excited light beam from the wall surface is reflected by utilizing the photostimulable phosphor plate of the first to third embodiments which are formed to reflect the light at the surface other than the hole forming portion of the phosphor plate 6.

Figure 1:
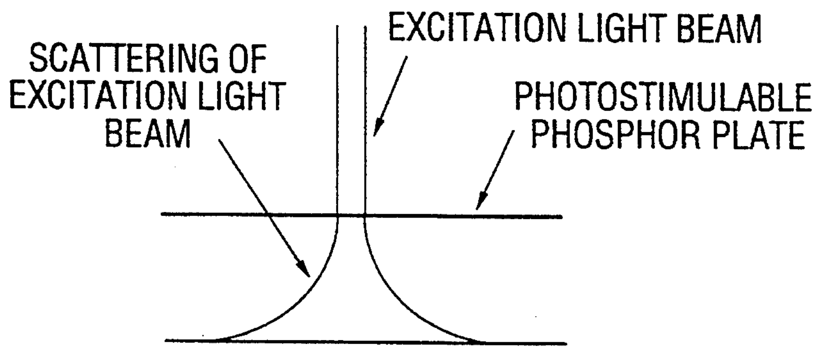
FIG. 1 PRIOR ART
FIG. 1 is a diagram for explaining scattering of an excited (i.e., excitation) light beam at the photostimulable phosphor of the prior art.
Figure 11:
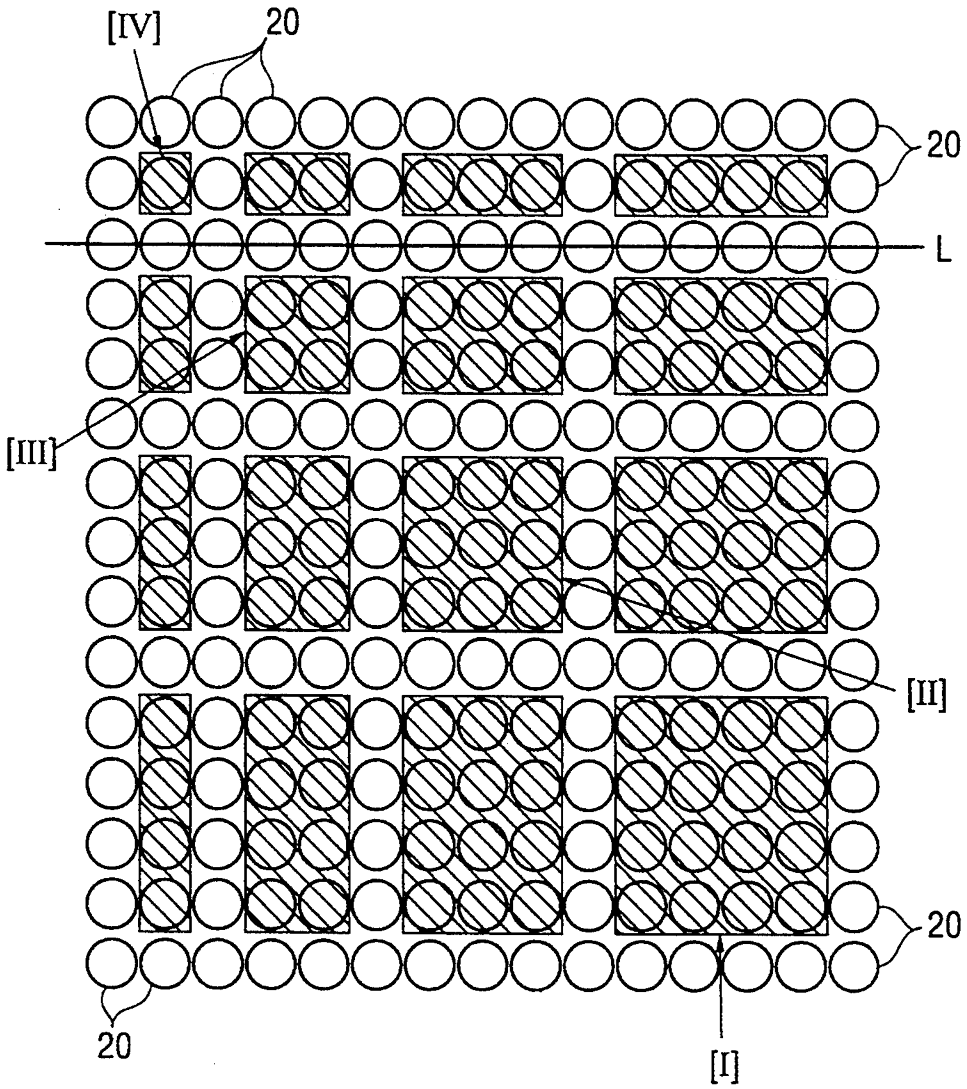
FIG. 11 shows a pixel forming profile and a number of fine holes in the pixel.
Figure 12:
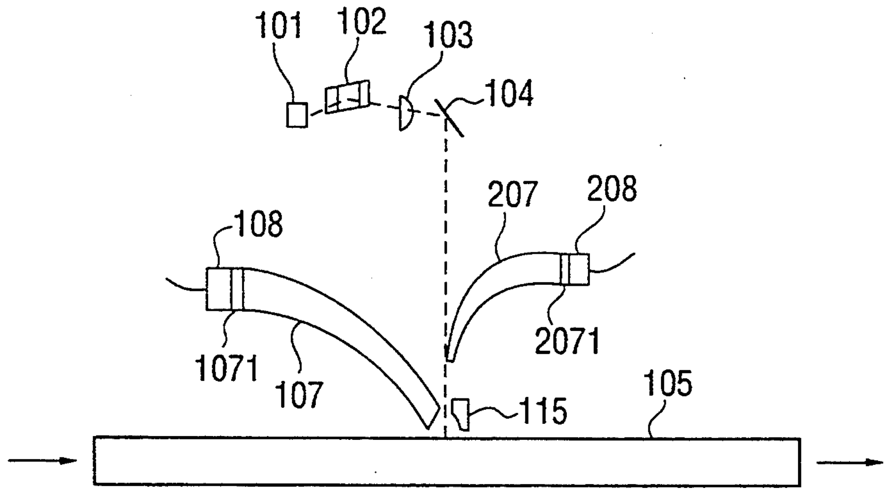
FIG. 12 shows a structure of a digital X-ray synchronized with the reflected and excited light beam.

FIG. 12 shows a structure wherein reflected excited light beam gathering optical guide path 207 for gathering the excited light beam is provided. The elements like those in FIG. 10 are designated by the like reference numerals. The reference numeral 1071 designates an excited light beam absorbing filter; 107, gathers the photostimulable fluorescent light and therefore it must absorb the reflected wave of excited light beam. The excited light beam absorbing filter 1071 absorbs the light of 600~900 nm (wavelength of excited light beam) and transmits the light of 400 nm (wavelength of photostimulable fluorescent beam). The reference numeral 115 designates a gathering mirror and gathers the light beam so that the excited light beam and emitted fluorescent light are not scattered. The numeral 207 designates a reflected excited light gathering and guiding path; 2071, emitted fluorescent light absorbing filter which absorbs the light in the vicinity of 400 nm (wavelength of emitted fluorescent light) and transmits the light of 600~900 nm (wavelength of excited light beam). And, the reference 208 designates a photosenser. This photosensor is a semiconductor sensor such as a photoelectron multiplier or photodiode. The emitted fluorescent light absorbing filter 2071 realizes power saving through selection of a kind of photoelectron multiplier. FIG. 12 indicates an arrangement for determining the timing of sampling. In FIG. 12, the numeral 108 designates a photoelectric converter; 208, a photosensor which is similar to that shown in FIG. 11. The emitted fluorescent light and excited beam are input to the photoelectric converter 108 and photosensor 208 respectively through the fiber array 107 and the reflected and excited light beam gathering and guiding path 207. Referring to FIG. 13, the emitted fluorescent light input from the photoelectric converter 108 is converted into the electrical signal and input to the A/D converter 110 through the amplifier 109. On the other hand, the excited light beam converted to the electrical signal in the photosensor 208 is compared with the reference voltage in the comparison circuit 209. FIG. 14 shows a timechart of the signals output from the circuit shown in FIG. 13. As shown in FIG. 14, when the electrical signal from the photosensor is lower than the reference voltage, the comparison circuit 209 outputs signals. The photosensor 208 receives the excited light beam. If the line L in FIG. 11 is scanned by the excited light beam, the surface other than the hole portions (the photostimulable phosphor is buried therein) intensively reflects the excited light in the case of FIG. 1. The excited light beam is absorbed by the hole portions in which the photostimulable phosphor is buried and the emitted fluorescent light is output therefrom through a certain degree of reflection. Therefore, an electrical signal indicated as 208 in FIG. 14 can be obtained from the excited light beam received by the photosensor 208. The excited light beam reflected from the reflecting part shows a high voltage, while the excited light beam reflected from the hole portion where the photostimulable phosphor is buried shows a low voltage. Comparison is carried out with reference to the reference voltage in the comparison circuit 209 in order to discriminate the hole portion and reflecting portion.

An output of comparison circuit 209 is input to the flipflop 210 which outputs a signal synchronized with the input signal thereto.

An output of the flipflop 210 is ANDed with the clock in the AND gate 211 and is then input to the A/D converter 110 as the operation clock. Namely, when an electrical signal of excited light beam (output of photosensor 208) is lower than the reference voltage, the A/D converter 110 operates and electrical signal of emitted fluorescent light (output of amplifier 109) is converted to a digital signal. The converted digital value is added by the adder 217 while an output of AND gate 211 is ON, and the added value is stored in the flipflop 218 (this flipflop is provided as many as the plural bits but is not illustrated in the drawings).

While the addition is carried out in the adder 218, an output of AND gate 211 is input to the counter 214 and the number of clocks is counted. When an output of the flipflop 210 becomes OFF, the counter is cleared and such value is stored in the flipflop 215.

Finally, a divider 219 outputs a value obtained by dividing a sum of outputs of A/D converter of flipflop 218 with a value of counter stored in the flipflop 215 to the memory 111. Namely, the emitted fluoresent light is sampled while the excited light beam passes the holes filled with the photostimulable phosphor by receiving the excited light beam.

In this embodiment, outputs of the A/D converter are added and an average value of these outputs is obtained. But, the present invention is not limited thereto. It is also possible that only addition or integration may also be carried out. Here, it is important to select the timing of such addition and the time for integration by receiving the excited light beam.

As explained previously, the present invention is capable of perfectly preventing deterioration of space resolution with the photostimulable phophor plate having the structure that the fine regions which does not penetrate the excited light beam are formed and the photostimulable phophor is buried in such fine regions and by reading the photostimulable phosphor with such structure.

We claim:

1. A digital X-ray apparatus which forms a latent image of an object on a photostimulable phosphor plate as an energy distribution pattern using X-ray energy and reads the latent image using an excitation light beam, comprising:

a plate having holes formed therein to define hole forming portions, said plate formed of a material that does not transmit the excitation light beam;

photostimulable phosphor positioned in the holes;

means for scanning said photostimulable phosphor plate;

emitted fluorescent light gathering means for gathering an emitted fluorescent light beam emitted from said photostimulable phosphor when the excitation light beam irradiates the photostimulable phosphor in the holes and for providing a signal responsive to the gathering of the fluorescent light beam;

reflected excitation light beam gathering means for gathering the excitation light beam reflected from said photostimulable phosphor plate and for providing a signal responsive to the gathering of the excitation light beam; and means for sampling, using the signal provided by said reflected excitation light beam gathering means and the signal provided by said emitted fluorescent light gathering means, the emitted fluorescent light in synchronization with the reflected excitation light beam.

2. A photostimulable phosphor plate reader which reads a latent image of an object, formed on a photostimulable phosphor plate as an energy distribution pattern using X-ray energy, the photostimulable phosphor plate having holes containing photostimulable phosphor formed in hole forming portions therein, the plate formed of material not transmitting an excitation light beam which illuminates the energy distribution pattern formed on the photostimulable phosphor plate, said photostimulable phosphor plate reader comprising:

means for scanning the photostimulable phosphor plate;

emitted fluorescent light gathering means for gathering a fluorescent light beam emitted from the photostimulable phosphor when the excitation light beam irradiates the photostimulable phosphor in the holes and for providing a signal responsive to the gathering of the fluorescent light beam;

reflected excitation light gathering means for gathering the excitation light beam reflected from the photostimulable phosphor plate and for providing a signal responsive to the gathering of the excitation light beam;

light beam irradiation period determining means for determining an irradiation period of the excitation light beam on the holes from the signal obtained from said reflected excitation light beam gathering means; and means for sampling the fluorescent light gathered by said photostimulable fluorescent beam gathering means as the latent image for the period determined by said reflected light beam irradiation period determining means.

3. A method of manufacturing a photostimulable phosphor plate, comprising the steps of:

(a) forming by etching, one or more through holes in a common pattern in each of plural metal sheets;

(b) stacking and bonding the plural metal sheets with the respective, one or more through holes of the common patterns thereof in aligned relationship, the stacked and bonded plural metal sheets having first and second exposed main surfaces;

(c) placing a photostimulable phosphor in each of the aligned, one or more through holes; and (d) forming a transparent protection film layer on the second, exposed main surface of said stacked and bonded plural metal sheets.

4. A method of manufacturing a photostimulable phosphor plate according to claim 3, further comprising the step of:

(e) forming the one or more through holes in a lattice along lines in first and second directions with spacing between the lines satisfying a relationship of $\Delta = b\eta$ where a read line pitch equal to a size of a pixel in the first direction is b, a scanning efficiency of scanning by the excitation light beam is $\eta$ and a positional deviation in the direction of the starting and ending points of the one or more through holes on a read line is $\Delta$.

5. A method of manufacturing a photostimulable phosphor plate, comprising the steps of:

(a) forming one or more through holes in a common pattern in each of plural sheets, a first sheet of the plural sheets having a first main surface;

(b) stacking and bonding the plural sheets with the respective, one or more through holes of the common patterns thereof in aligned relationship, a first main surface of the first sheet defining a first main surface of the stacked and bonded plural sheets and the stacked and bonded plural sheets having a second main surface opposed to the first main surface thereof;

(c) placing a photostimulable phosphor in each of the aligned, one or more through holes; and (d) forming a transparent protection film on the second main surface of said stacked and bonded plural metal sheets.

6. A method of manufacturing a photostimulable phosphor plate according to claim 5, further comprising the step of:

(e) forming the one or more through holes in a lattice along lines in first and second directions with spacing between the lines satisfying a relationship of $\Delta = b\eta$ where a read line pitch equal to a size of a pixel in the first direction is b, a scanning efficiency of scanning by the excitation light beam is $\eta$ and a positional deviation in the direction of the starting and ending points of the one or more through holes on a read line is $\Delta$.

* * * * *

UNITED STATES PATENT AND TRADEMARK OFFICE

CERTIFICATE OF CORRECTION

PATENT NO. : 5,444,266

DATED : Aug. 22, 1995

INVENTOR(S) : TAKEDA et al.

It is certified that error appears in the above-indentified patent and that said Letters Patent is hereby corrected as shown below:

TITLE PAGE: [75] Inventors, second line, change "Machida" to --Tokyo--.

Col. 5, line 66, after "appear" insert --,--.

Col. 6, line 38, after "formation of" insert --the--.

Col. 10, line 9, after "written" delete "in";
line 60, change "reacting" to --reading--.

Signed and Sealed this

Thirteenth Day of February, 1996

Attest:

BRUCE LEHMAN

*Attesting Officer* *Commissioner of Patents and Trademarks*